United States Patent
Jackson

(10) Patent No.: US 8,630,838 B2
(45) Date of Patent: Jan. 14, 2014

(54) SYSTEMS AND METHODS FOR PROVIDING TRANSLATIONS OF APPLICATIONS USING DECENTRALIZED CONTRIBUTIONS

(71) Applicant: United Parcel Service of America, Inc., Atlanta, GA (US)

(72) Inventor: Erich Ryan Jackson, Louisville, KY (US)

(73) Assignee: United Parcel Service of America, Inc.

( * ) Notice: Subject to any disclaimer, the term of this patent is extended or adjusted under 35 U.S.C. 154(b) by 0 days.

(21) Appl. No.: 13/777,405

(22) Filed: Feb. 26, 2013

(65) Prior Publication Data
US 2013/0179146 A1 Jul. 11, 2013

Related U.S. Application Data

(63) Continuation of application No. 12/203,407, filed on Sep. 3, 2008, now Pat. No. 8,412,511.

(51) Int. Cl.
*G06F 17/28* (2006.01)

(52) U.S. Cl.
USPC .................................. 704/3; 704/2; 704/8

(58) Field of Classification Search
USPC ...................................... 704/2, 3, 8
See application file for complete search history.

(56) References Cited

U.S. PATENT DOCUMENTS

| | | | |
|---|---|---|---|
| 5,243,519 A | 9/1993 | Andrews et al. | |
| 5,900,871 A | 5/1999 | Atkin et al. | |
| 5,974,372 A | 10/1999 | Barnes et al. | |
| 6,035,121 A | 3/2000 | Chiu et al. | |
| 6,205,418 B1 | 3/2001 | Li et al. | |
| 6,334,101 B1 | 12/2001 | Hetherington et al. | |
| RE37,722 E | 5/2002 | Burnard | |
| 6,490,547 B1 | 12/2002 | Atkin et al. | |
| 6,904,401 B1 | 6/2005 | Hauduc et al. | |
| 6,957,425 B1 | 10/2005 | Nadon et al. | |
| 6,981,031 B2 | 12/2005 | French et al. | |
| 6,983,238 B2 | 1/2006 | Gao | |
| 6,993,568 B1 | 1/2006 | Hauduc et al. | |
| 7,024,546 B2 | 4/2006 | Real | |
| 7,110,937 B1 | 9/2006 | Lei et al. | |
| 7,113,904 B2 | 9/2006 | Litster | |

(Continued)

OTHER PUBLICATIONS

"XML definition," from "Computer, Telephony & Electronics Industry Glossary," image retrieved from the Internet Archive with date of May 12, 1997.

(Continued)

*Primary Examiner* — Vincent P Harper
(74) *Attorney, Agent, or Firm* — Alston & Bird LLP

(57) ABSTRACT

Various embodiments of the present invention provide systems and methods for providing a translation for a set of one or more terms or phrases related to a software application using decentralized contributions. In particular, various embodiments provide systems and methods by which multiple users of the application contribute translations for individual terms or phrases of the application instead of having one entity supply the translation of the software application. Specifically, the process of various embodiments: (1) provides a repository for storing translations of the individual terms or phrases in a target language (e.g., a language for which a translation is needed); (2) collects the translations provided by users and stores the translations in the repository; (3) identifies the preferred translation for each individual term or phrase; and (4) displays the preferred translation to the user in response to receiving a user's request for a preferred translation in the target language.

33 Claims, 9 Drawing Sheets

(56) References Cited

U.S. PATENT DOCUMENTS

| | | |
|---|---|---|
| 7,283,950 B2 | 10/2007 | Pournasseh et al. |
| 7,284,199 B2 | 10/2007 | Parasnis et al. |
| 7,536,294 B1 | 5/2009 | Stanz et al. |
| 2003/0126559 A1 | 7/2003 | Fuhrmann |
| 2005/0267738 A1* | 12/2005 | Wilkinson et al. ............... 704/9 |
| 2006/0287844 A1 | 12/2006 | Rich |
| 2008/0177528 A1* | 7/2008 | Drewes ............................ 704/2 |
| 2010/0048242 A1* | 2/2010 | Rhoads et al. ............. 455/556.1 |

OTHER PUBLICATIONS

United States Patent and Trademark Office, Office Action for U.S. Appl. No. 12/203,407, dated Jun. 29, 2012, 20 pages, USA.

United States Patent and Trademark Office, Office Action for U.S. Appl. No. 12/203,407, dated Oct. 19, 2012, 21 pages, USA.

United States Patent and Trademark Office, Notice of Allowance for U.S. Appl. No. 12/203,407, dated Nov. 28, 2012, 5 pages, USA.

* cited by examiner

SYSTEMS AND METHODS FOR PROVIDING TRANSLATIONS OF APPLICATIONS USING DECENTRALIZED CONTRIBUTIONS

CROSS-REFERENCE TO RELATED APPLICATIONS

This application is a continuation of U.S. application Ser. No. 12/203,407, filed on Sep. 3, 2008, which is hereby incorporated herein in its entirety by reference.

BACKGROUND OF THE INVENTION

Many software applications, and in particular those that make use of one or more Graphic User Interfaces (GUI), are usually provided in one primary language. However, over the years, many developers have found it advantageous to deploy (e.g., market and sell) their applications in other countries and in multiple languages as the demand for such software applications has increased throughout the world.

Thus, for such applications to be effectively used in multiple countries, the development of the applications requires translation in some form. For example, a GUI may have a drop down menu that displays options such as new, open, or save. Therefore, if the developer would like to distribute the software application that makes use of this GUI in France, the developer would need to translate this drop down menu and corresponding options into French so that a French speaking user would be able to effectively use the application.

Many times, an outside party (e.g., translation service) is contracted to perform the translation. The process of having an application translated into another language may involve: (1) providing an export of the text from the application in human-readable form for translation to the translation service; (2) communicating the context of the text to be translated to the translating agents working for the translation service; (3) importing the translated text into the original application once the translation is completed; and (4) distributing and maintaining multiple versions of the application to provide the application in multiple languages. Thus, this process is very time consuming and costly.

As a result, the typical approach followed by software developers in handling distribution to multiple countries is to either keep the application in the native language in which it is written or to offer different, discreet packages of the application that include a translation. Therefore, a developer runs the risk of losing potential customers by only providing the software in its native language or runs the high cost of providing multiple versions of the software.

Thus, a need in the art exists for a process that allows a developer to develop software in a native language and allows the developer to provide the software in a different language without having to have the application translated by a costly translation service and without having to manage multiple versions of the software application.

BRIEF SUMMARY OF VARIOUS EMBODIMENTS OF THE INVENTION

A system for providing a translation of a set of one or more terms or phrases from a source language to a target language according to various embodiments comprises memory adapted to store one or more translations for the set of terms or phrases in the target language and a processor in communication with the memory and adapted to execute a translation module. The translation module according to various embodiments is adapted to obtain one or more translations for individual terms or phrases of the set of terms or phrases provided by one or more users and store the translations in memory. For example, these users may provide translations of terms or phrases comprising visible labels, error text, and other user-readable text associated with one or more graphical user interfaces (GUI) of an application.

In addition, the translation module according to various embodiments is further adapted to identify a preferred translation for each individual term or phrase of the set of terms or phrases in response to receiving a user's request for a preferred translation of the set of terms or phrases in a target language and to display the identified preferred translation to the user. In various embodiments, the preferred translation for each individual term or phrase is the translation most frequently obtained from the users for each individual term or phrase in the target language. For instance, the preferred translation may be the translation for the individual term or phrase stored the most number of times in memory in the target language.

In a particular embodiment, the memory comprises a database. In addition, in a particular embodiment, the translations are stored locally on a user's system to be used as preferred translations for the particular user.

Furthermore, a system for providing a translation of a set of one or more terms or phrases from a source language to more than one target language according to various embodiments comprises a memory adapted to store one or more translations of the set of terms or phrases in more than one target language and a processor in communication with the memory and adapted to execute a translation module. Accordingly, the translation module is adapted to: (1) obtain one or more translations in more than one target language for individual terms or phrases of the set of terms or phrases provided by one or more users; (2) store the translations for the individual terms or phrases in memory; and (3) in response to receiving a user's request for a preferred translation of each term or phrase in a particular target language, (a) identify the preferred translation for each individual term or phrase, and (b) display the preferred translation to the user.

In various embodiments, the module identifies the preferred translation for each individual term or phrase as the translation most frequently obtained from the users for each individual term or phrase in the particular target language. For instance, the preferred translation is the translation stored the most number of times in memory for the individual term or phrase in the particular target language.

In addition, in various embodiments, the translation module is further adapted to identify a particular target language for a user in response to receiving a request from the user for a preferred translation. Furthermore, the translation module is adapted to store a first particular target language and a second particular target language for a particular user according to various embodiments. In such embodiments, the translation module is adapted to retrieve a user's first and second particular target languages in response to receiving a request from the user for a preferred translation and to identify the preferred translation for each individual term or phrase in the user's first particular target language. Furthermore, the module is adapted to identify a preferred translation for an individual term or phrase in the user's second particular target language in response to a translation not being obtained for the particular individual term or phrase in the user's first particular target language.

A computer-implemented process for providing a translation of a set of one or more terms or phrases from a source language to a target language according to further embodiments comprises providing a repository in a memory for storing one or more translations of the set of terms or phrase in the target language and collecting the translations provided by one or more users. Furthermore, the step of collecting the translations comprises obtaining one or more translations for individual terms or phrases of the set of terms or phrases and storing the translations in the repository. In addition, the process further comprises identifying a preferred translation for each individual term or phrase of the set of terms or phrases and displaying the identified preferred translation to a user in response to receiving a request from the user for the preferred translation. In various embodiments, the preferred translation for each individual term or phrase is the translation most frequently obtained from the users for the individual term or phrase in the target language.

Finally, a computer-implemented process for providing a translation of a set of one or more terms or phrases from a source language to more than one target language according to various embodiments comprises providing a repository in memory for storing one or more translations of the set of terms or phrases in more than one target language and collecting the translations provided by one or more users. Furthermore, the step of collecting the translations in various embodiments comprises obtaining one or more translations in more than one target language for individual terms or phrases of the set of terms or phrases and storing the translations in the repository. In addition, the process further comprises identifying a preferred translation for each individual term or phrase of the set of terms or phrases and displaying the identified preferred translation to a user in response to receiving a request from the user for the preferred translation. In various embodiments, the preferred translation for each individual term or phrase is the translation most frequently obtained from the users for the individual term or phrase in the particular target language.

The process further comprises in various embodiments storing a first particular target language and a second particular target language identified by a user. In such embodiments, the process retrieves the user's first and second particular target languages. The process then identifies the preferred translation for each individual term or phrase in the user's first particular target language and in response to a translation not being provided for an individual term or phrase in the user's first particular language, identifies a preferred translation for the particular individual term or phrase in the user's second particular target language.

DETAILED DESCRIPTION OF THE INVENTION

Figure 1:
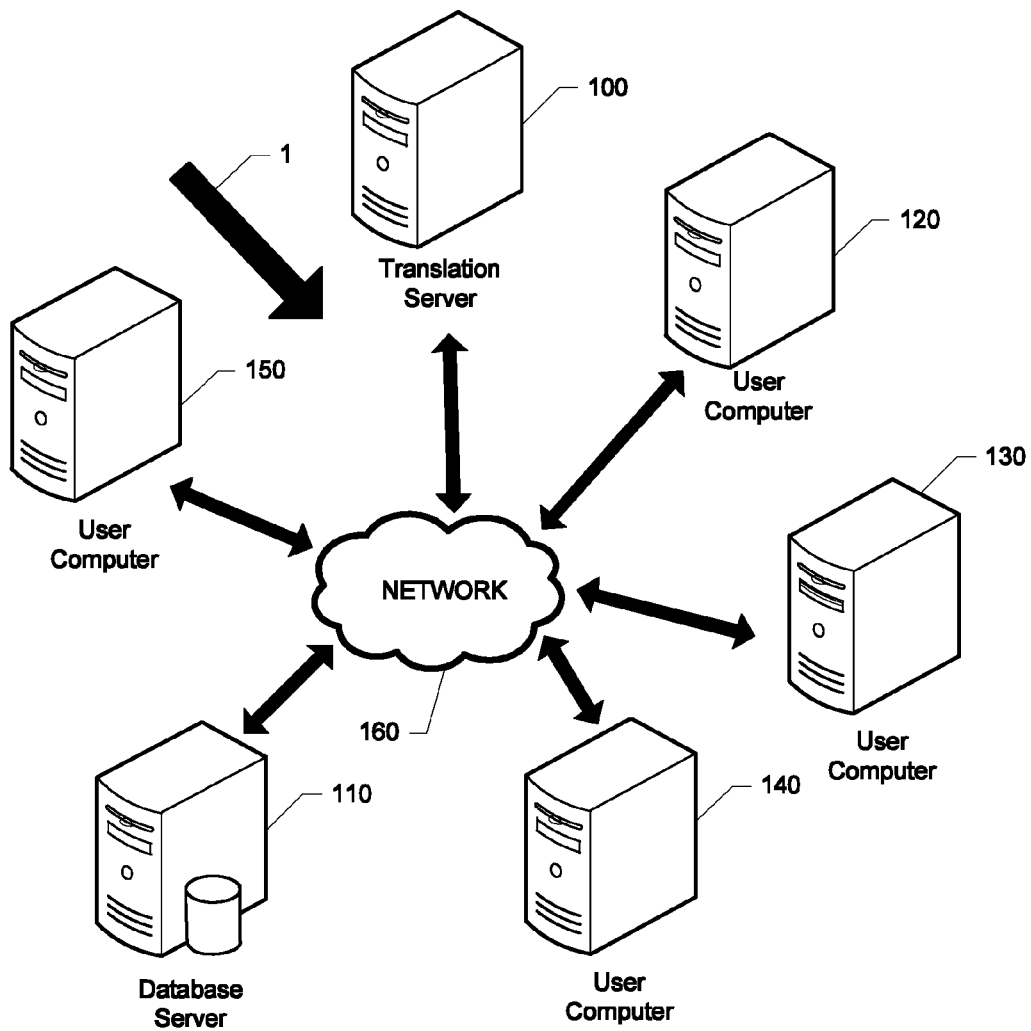
FIG. 1 is a schematic diagram illustrating a translation processing system according to various embodiments of the invention.

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, flash drives, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

Various embodiments of the present invention provide systems and methods for providing a translation for a set of one or more terms or phrases using decentralized contributions instead of having one entity translate the set of one or more terms and phrases. These terms and phrases may be related to a software application and, in particular, a user's interaction with the application. For example, the terms and phrases may include visible labels, error text, and other user-readable text associated with one or more Graphical User Interfaces (GUI) of the application.

According to various embodiments, multiple users of a software application contribute translations for individual terms and phrases used in the application, and a preferred translation for each term or phrase is identified and displayed. In particular, translations of a set of one or more terms or phrases in a target language (e.g., a language for which a translation is needed) are collected from one or more users and stored. According to a particular embodiment, the preferred translation may be identified as the translation provided most frequently. In addition, the process of displaying the preferred translation may involve replacing each individual term or phrase in the software application with the corresponding preferred translation. As a result, the terms and phrases appear in the application in the preferred language. According to various other embodiments, translations of the set of terms or phrases may be provided in more than one target language.

In various embodiments, a user may also select more than one target language to establish a hierarchy for identifying a preferred translation. In particular, the user selects a first target language, a second target language, and so forth to establish the hierarchy for the user. For example, the user may select English as his first target language and select French as his second target language. As a result, a preferred translation for each individual term or phrase for the user's first target language is identified, and if a translation has not been provided for a particular term or phrase in the user's first target language (e.g., English), a preferred translation for the particular term or phrase in the user's second target language (e.g., French) is identified.

System Architecture

A system 1 according to various embodiments of the invention is shown in FIG. 1. As may be understood from this figure, in various embodiments, the system includes a translation server 100, a database server 110, and one or more user servers 120, 130, 140, and 150 that are connected via a network 160 (e.g., a LAN, the Internet, a wireless network, and/or a private network) to communicate with one another. In one embodiment of the invention, the translation server 100 is configured for retrieving data from, and storing data to, a database located on the database server 110 (or, alternatively, located on the translation server 100). In an alternative embodiment, the system 1 may include more than one database. In other embodiments, the translation server 100 and/or database server 110 may be one or more computers or software programs running on one or more computers.

Figure 2:
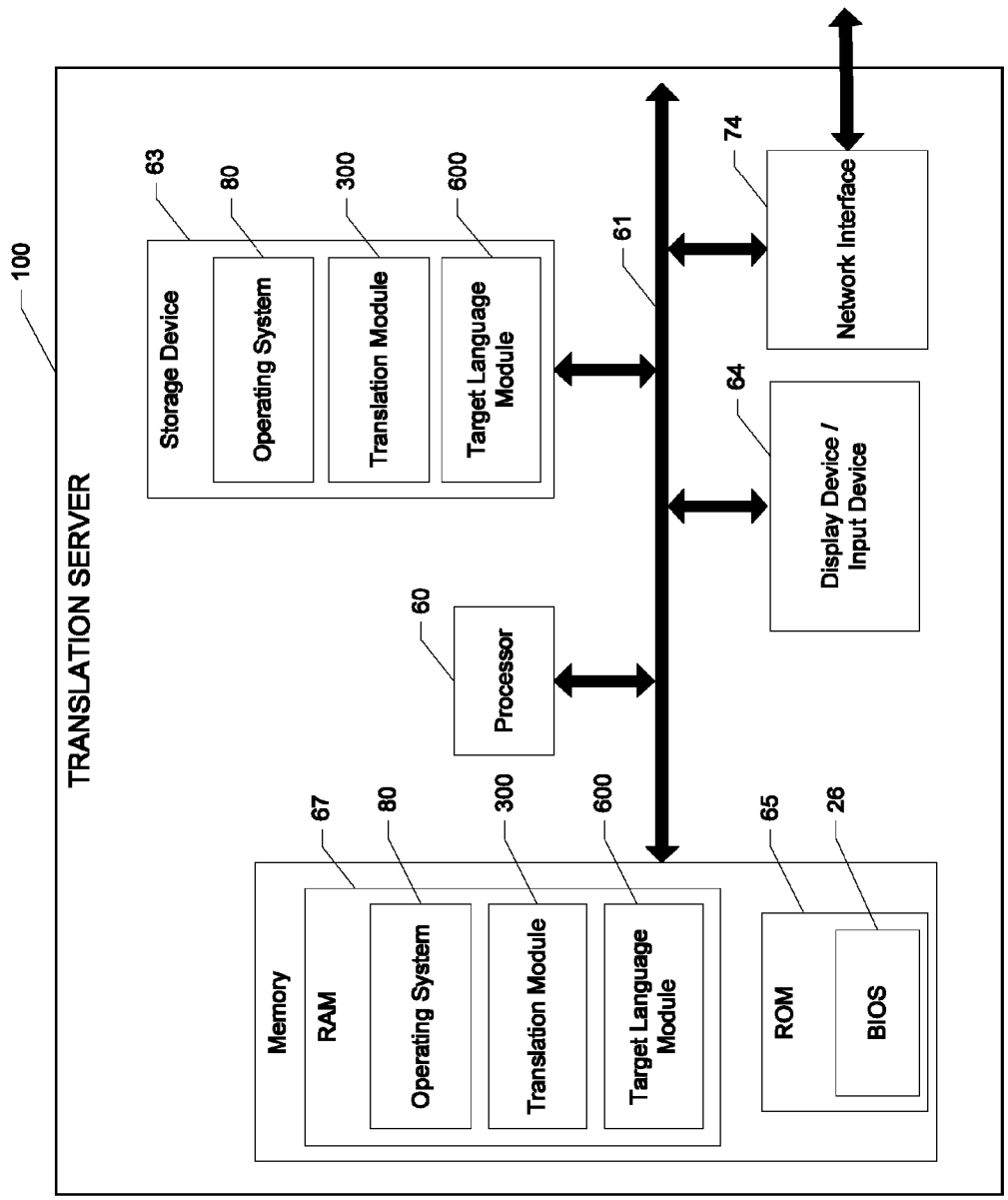
FIG. 2 is a schematic diagram illustrating a translation server according to various embodiments of the invention.

FIG. 2 shows a schematic diagram of a translation server 100 according to one embodiment of the invention. The translation server 100 includes a processor 60 that communicates with other elements within the translation server 100 via a system interface or bus 61. Also included in the server 100 is a display device/input device 64 for receiving and displaying data. This display device/input device 64 may be, for example, a keyboard or pointing device that is used in combination with a monitor. The server 100 further includes memory 66, which preferably includes both read only memory (ROM) 65 and random access memory (RAM) 67. The server's ROM 65 is used to store a basic input/output system 26 (BIOS), containing the basic routines that help to transfer information between elements within the server 100. Alternatively, the translation server 100 can operate on one computer or on multiple computers that are networked together.

In addition, the server 100 includes at least one storage device 63, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the server bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 2, program modules of the translation server 100 may include an operating system 80, a translation module 300, and a target language module 600. The translation module 300 and target language module 600 may be used to control certain aspects of the operation of the translation server 100, as is described in more detail below, with the assistance of the processor 60 and an operating system 80.

Also located within the server 100 is a network interface 74, for interfacing and communicating with other elements of a computer network. It will be appreciated by one of ordinary skill in the art that one or more of the server's 100 components may be located geographically remotely from other server 100 components. Furthermore, one or more of the components may be combined, and additional components performing functions described herein may be included in the system 1.

Exemplary System Operation

As mentioned above, the system 1 according to various embodiments enables transmission of translations for a set of one or more terms or phrases over a network. In particular, in various embodiments, the translation server 100 includes a translation module 300 and a target language module 600. The translation module 300 is configured to communicate translations and related information between one or more user computers 120, 130, 140, and 150, a database server 110, and the translation server 100. In addition, in a particular embodiment, the translation module 300 identifies the preferred translation for the set of one or more terms or phrases and provides additional administrative functions. The target language module 600 is configured to display a list of target languages, and receive and store a user's preferences for one or more target languages. These modules 300 and 600 are discussed in more detail below.

Translation Module

Figure 3:
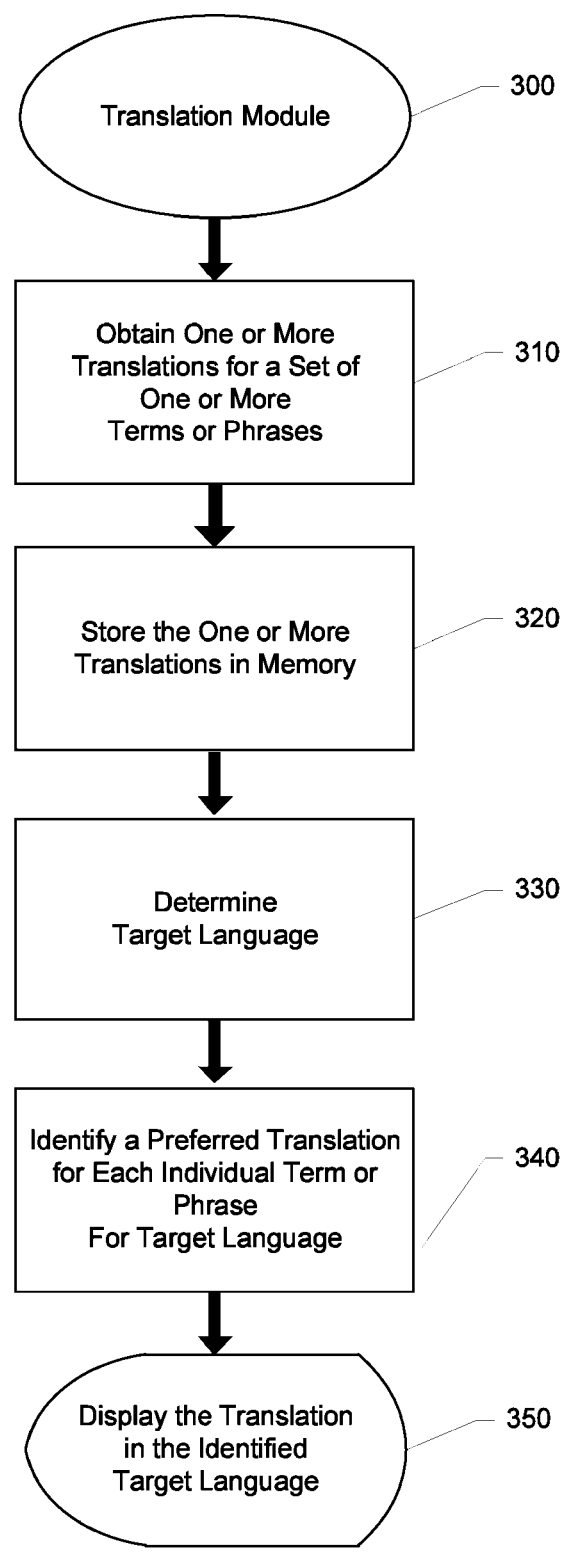
FIG. 3 is a flow diagram of a translation module to various embodiments of the invention.

FIG. 3 illustrates a flow diagram of a translation module 300 according to various embodiments of the invention. This flow diagram may correspond to the steps carried out by the processor 60 in the server 100 shown in FIG. 2 as it executes the translation module 300 in the server's 100 RAM memory 67 according to various embodiments.

Beginning at Step 310, the translation module 300 obtains one or more translations for a set of one or more terms or phrases from one or more users 120, 130, 140, and 150 over a communications network 160. The term "obtain" is used to mean receive or access the translations. This may be accomplished via numerous mechanisms according to various embodiments. For example, a user may encounter a visible label, error text, and other user-readable text found on the GUI of an application. The user may simply right click on a label or text, and a dialog box appears on the screen to allow the user to select a target language and input the appropriate translation for the target language. The label or text is then changed on the screen, and the translation is sent to the translation module 300.

The module 300 then stores the translations provided by the users in memory in Step 320. In various embodiments, the memory may hold a database in which the translations are stored. This database may be located on a database server 110 in communication with the translation server 100 over the network 160, located locally on the translation server 100, or located on multiple servers in communication over the network 160. According to various other embodiments, the module 300 may store the translations in a library composed of a directory architecture in the memory of a computer that provides a number of directories and the translations are stored as files in the directories within the directory architecture. The directory architecture may be set up based on a hierarchy so that files may be easily located.

Next, in Step 330, the translation module 300 determines a target language for displaying the one or more terms and phrases to the user. According to various embodiments, if the user has input translations of one or more terms or phrases in Step 310, the target language is the language provided by the user in Step 310. However, if the user does not provide translations in Step 310, the target language is the language selected by the user during the current session (or previous sessions) of the application. This selection process is described in more detail below in relation to the target language module 600 described in FIG. 6. For example, the user's selected target language may be retrieved from the control panel, from the view preferences for the desktop, or from the local settings on Windows®. In addition, the user's selected target language may be received and stored by the target language module 600 during a first session of using the application, and this preference is retrieved by the translation module 300 when the user logs into the application for a second or subsequent session. In a more specific example, the user logs in to an application and indicates his preferred language on the login screen to the application. The user's preferred language is stored, according to one embodiment, in a user rights table in a database. In subsequent sessions, the user's identity is captured upon login and forwarded to the translation module 300, which then queries the database and retrieves the preferred language for the particular user from the database. In another embodiment, the user's preferred language is stored locally on the user's computer system and is retrieved by the application or the translation module 300. In yet another embodiment, the preferred language is not stored for each user, and each user requests the preferred target language during each session (e.g., at login) of the application.

In various alternative embodiments, the target language may not be selected by the user. Instead, the module 300 identifies the target language based on the location where the application is being used or based on the particular application or type of application from which the request is made for a translation. For example, the translation module 300 may receive a request for a translation from a computer having an IP address associated with France. Thus, the module 300 identifies the target language as French.

Upon determining the target language in Step 330, the translation module 300 then identifies a preferred translation for each individual term or phrase (e.g., element) for the target language as shown in Step 340. For example, in one embodiment, the module 300 identifies the preferred translation for each individual term or phrase as the translation most frequently provided by the users for the particular term or phrase in the target language. In other embodiments, the module 300 executes program logic that includes rules to determine which translations to consider in identifying the preferred translation. In other embodiments, the module 300 identifies particular translations marked in the database as the preferred translation. For example, an administrator of the system may periodically review the provided translations and mark a particular translation in the database as the preferred translation.

The translation module 300 then displays the preferred translation to the user in Step 350. For instance, in a particular embodiment, the module 300 returns the identified preferred translation for each term and phrase of the set of one or more terms or phrases for every GUI for the application at one time to populate all the GUIs. In other embodiments, the translation module 300 returns the identified preferred translation only for the terms and phrases displayed on the particular GUI with which the user is interacting at the time. Displaying the terms and phrases for the particular GUI with which the user is interacting may increase the speed of providing a preferred translation because only a limited amount of the translation is needed at any one time, according to various embodiments. In addition, the amount of data and overhead that is sent over the network 160 from the translation module 300 to the application can be lowered, according to various embodiments.

Figure 4:
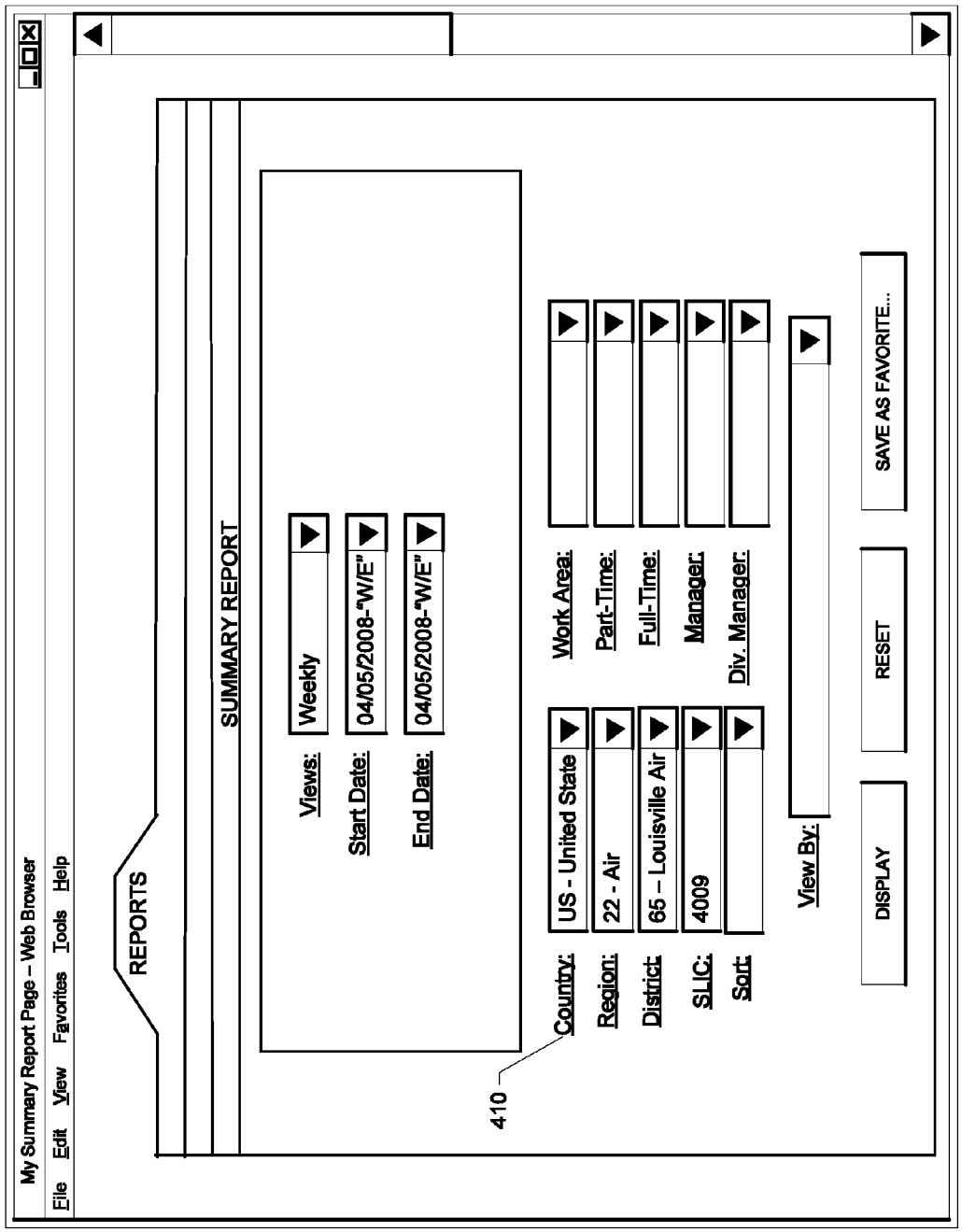
FIG. 4 is an exemplary graphical user interface according to various embodiments of the invention.

In various embodiments, the GUIs may be website screens accessed via a web browser by the user over the Internet. One such GUI is shown in FIG. 4. In this example of a website screen, labels on the GUI are hyperlinks and links and buttons on the GUI have an icon beside them. The user clicks on a particular hyperlink or icon, and the GUI provides a pop-up window that appears and allows the user to input a translation for the corresponding label, link, or button. The pop-up window in various embodiments displays the current language being displayed for the particular label, link, or button, the current text, a "translate to" field for the user to enter the language (e.g., French) for which he is providing the translation, a field to enter the translation text, a button to submit the translation, and a button to cancel. Thus, the user simply enters the language he is providing for the translation of the label, link, or button, the translated text, and selects the submit button. The GUI automatically changes the label, link, or button on the original website screen to the provided translation and sends the translation via the network 160 to the translation module 300.

For example, the user may click on the hyperlink for the label "Country" 410 displayed on the website screen shown in FIG. 4. A pop-up window is displayed that shows the current language is English and the current text is "Country." The user selects the language French from a drop-down menu provided on the pop-up window, enters "Pays," and selects the submit button. In response, the label "Country" 410 is displayed as "Pays" on the website screen shown in FIG. 4, and the translation is sent to the translation module 300. In addition, according to various embodiments, additional screens for the website that use the label "Country" 410 also display the term "Country" as "Pays." The user may repeat this process for the remaining labels, links, and buttons on the website screen until the entire screen has been translated to French and the corresponding translations have been sent to the translation module 300.

Repository

Figure 5:
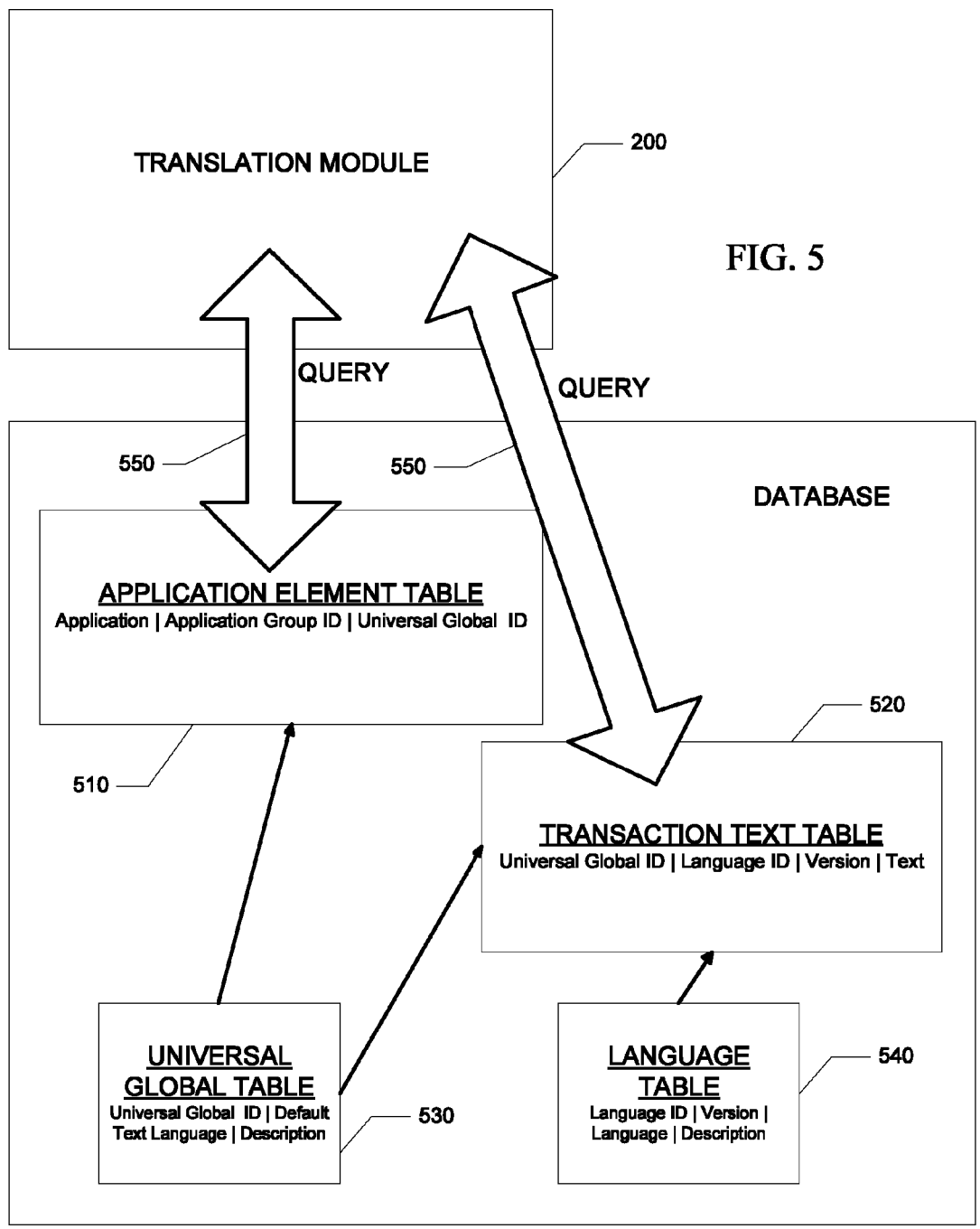
FIG. 5 is a schematic diagram illustrating a database storing translations according to various embodiments of the invention.

In various embodiments in which a database is utilized as a repository to store the one or more translations, the database may be any one of a number of common types of databases as known in the art, such as Oracle (registered trademark of Oracle International Corporation, Redwood, Calif.) or Microsoft SQL Server (registered trademark of Microsoft Corporation, Redmond, Wash.). In addition, the database structure may be made up of a number of tables, and the database may be managed via a database management system. For example, various tables are depicted in FIG. 5 for a database 500 according to a particular embodiment. However, it should be understood that the tables shown in FIG. 5 may not be the only tables that make up the database 500. The database 500 may include additional tables such as, for example, a user rights table that stores user information and security information.

In FIG. 5, an application element table 510 is provided in the database 500 to store records of the elements associated with one or more applications. In various embodiments, elements may encompass a set of one or more terms or phrases that may be visible labels, error text, and other user-readable text associated with one or more GUIs of the one or more applications. For example, several applications such as word processing applications and spreadsheet applications have a drop down menu that includes the element "SAVE" that is selectable by the user to save the user's word processing document or spreadsheet.

The application element table 510 of this particular embodiment provides fields to store the application name, application group ID, and universal global ID. The application field identifies the name of the particular application that makes use of the particular element. The application group ID field is a unique identifier that identifies the particular application. The universal global ID is a unique identifier that identifies the particular element. Thus, in various embodiments of the invention, the developer of an application populates this table 510 with records (e.g., one record for each combination of application and element) to associate particular elements encountered by a user while using the application.

A universal global table 530 is provided to store records for each element that is encountered by a user while using one or more of the applications. The universal global table 530 of this particular embodiment provides fields to store the universal global ID, default text language, and description. As discussed above, the universal global ID field is a unique identifier that identifies a particular element. In a particular embodiment, the universal global ID is unique to the universal global table 530 and serves as a primary key. This ensures that each universal global ID represents only one element. The default text language field is the text language of the element in the original development language. For example, as discussed above, an element in several word processing and spreadsheet applications is "SAVE." Thus, if the application was originally developed in English, the default text language for this element is "SAVE." The description field provides a description of what the element does in an application. For instance, this field may be populated with "save document to nonvolatile memory" for the element "SAVE."

In addition, a relationship exists between the universal global ID field of this table 530 and the universal global ID field of the application element table 510. In one particular embodiment, the developer populates this table 530 with one record for each element, and a record using a particular universal global ID cannot be inserted into the application element table 510 without first existing in a record in the universal global table 530. Thus, an element cannot exist in the application element table 510 for a particular application without first being defined in the universal global table 530.

A language table 540 is also provided to store records for each language and dialect for which a translation is provided. The language table 540 of this particular embodiment provides fields to store the language ID, version, language, and description. The language ID field is a unique identifier that identifies a particular language, for example, French. The version field is used in combination with the language ID to identify a particular dialect for a language. For example, the language ID FR99 may represent the French language. The language ID FR99 and version 1 may be used to represent French-France and the language ID FR99 and version 2 may be used to represent French-Canada. Ideally, in this embodiment, each language ID field and version field combination is unique to the language table 540 and serves as a primary key. The language field is used to store the name of the language in text form such as "French," and the description field is used to store a description of the language such as "François-Canadian."

Furthermore, a translation text table 520 is provided in the database 500 to store the one or more translations provided by the users of the set of one or more terms or phrases (e.g., set of elements). The translation text table 520 of this particular embodiment provides fields to store the universal global ID, language ID, version, and text. The universal global ID field is similar to the universal global ID discussed in regard to the application element table 510 and the universal global table 530. This field stores the unique identifier for a particular element encountered by the users during the use of one or more of the applications. In addition, a relationship exists between the universal global ID field of this table 520 and the universal global ID field of the universal global table 530. As is the case with the application element table 510, according to one embodiment, a record using a particular universal global ID cannot be inserted into the translations text table 520 without first existing in a record in the universal global table 530. This is to ensure a translation is not provided for an element without first defining the element in the universal global table 530

The language ID and version fields are similar to the language ID and version fields in the language table 540. The combinations of these two fields represent the particular language and the particular dialect of the translation provided. In one embodiment, a record using a particular combination of a language ID and a version cannot be inserted into the translation text table 520 without first existing in a record in the language table 540. This is to ensure a translation for a particular language and dialect cannot be provided without first defining the language and dialect combination in the language table 540.

The text field stores the actual translation provided for the particular element associated with the universal global ID for the language and dialect associated with the language ID and version. Thus, in various embodiments, the translation text table 520 interfaces with the translation module 300 to exchange translations between the module 300 and the database 500. In addition, in various embodiments the application element table 510 interfaces with the translation module 300 to exchange information about the elements and the applications related to the elements.

As will be appreciated by one of ordinary skill in the art, the database 500 may interact with the translation module 300 for additional reasons, such as, for example, to exchange information on specific users or to exchange information on security settings. Lastly, the database 500 may bypass the translation module 300 and communicate directly with the one or more applications according to various embodiments. Therefore, when a user provides a translation for a particular element, instead of the translation being sent to the translation module 300 first, it is sent directly to the database 500 to be stored.

Thus, returning to the embodiment of the database 500 shown in FIG. 5, a user requests a preferred translation from a particular application. In response, the module 300 queries 550 the application element table 510 using the application group ID to determine what terms and phrases (e.g., elements) are associated with the particular application, and the application element table 510 returns to the translation module 300 a listing of the terms and phrases associated with the particular application.

The translation module 300 then queries 560 the translation text table 520 for each individual term and phrase found in the listing returned from the application element table 510. The query is based on the universal group ID for the particular term or phrase (e.g., element) and the language ID and version associated with the target language according to various embodiments. The query may return one or more records for each term or phrase, and the translation module 300 identifies the preferred translation for the particular term or phrase based on the logic enabled in the module 300. The module 300 repeats this process for each individual term and phrase until the module has attempted to identify a preferred translation for each term and phrase found on the listing returned from the application element table 510.

In some situations, a translation may not have been provided for a particular term or phrase. In one embodiment, the system returns a translation in a default language for the particular term or phrase. For example, a translation may not have been provided for the element "EXIT" in French. The default language may be English, and therefore the translation "EXIT" is returned as the preferred translation for this element.

It should be noted that the repository may serve other purposes in addition to storing the translations according to various embodiments of the invention. For instance, according to one embodiment, the repository may store a user identifier along with each translation. This user identifier can be used to track what translations have been provided by a particular user. In another embodiment, a computing device identifier (e.g., IP address) may be stored along with each translation instead of, or along with, the user identifier. Thus, this may serve as another way to track the source of a particular translation.

In an alternative embodiment, a user's provided translations may be stored locally on his computer system. For instance, the translations may be stored in an XML file or a text file locally on the user's hard drive. This local storage allows the user to use his translations as the preferred translations for particular terms or phrases. Accordingly, the translation module 300 (or the application) determines whether the user has saved any translations locally and identifies these translations as the preferred translations.

Target Language Module

According to various embodiments, the system includes a target language module 600 that displays a list of one or more target languages available for users, receives the user's selection of a preferred target language, and stores the selection.

Figure 6:
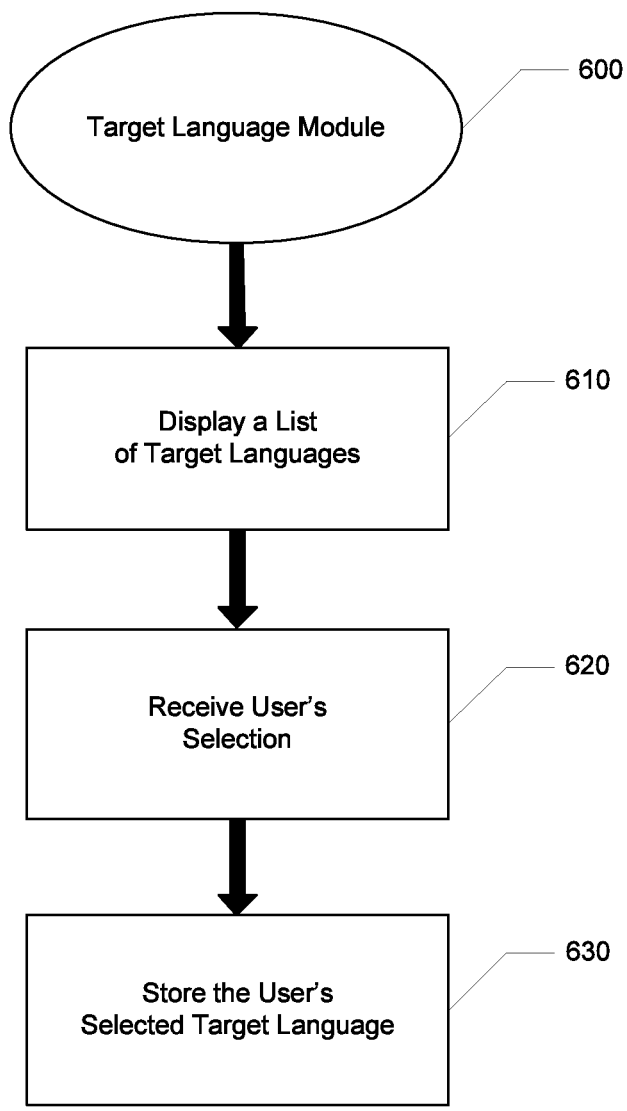
FIG. 6 is a flow diagram of a target language module for obtaining and storing first and second particular target languages according to various embodiments of the invention.

FIG. 6 illustrates a flow diagram of the target language module 600 according to various embodiments. This flow diagram may correspond to the steps carried out by the processor 60 in the server 100 shown in FIG. 2 as it executes the target language module 600 in the server's 100 RAM memory 67 according to various embodiments.

In particular, the module 600 displays a list of one or more target languages to the user, as shown in Step 610. For example, the module 600 provides the user with a GUI that displays a list of target languages for which a translation can be provided. The user then selects a particular target language from the list of target languages, and in Step 620, this selection is received by the target language module 600. In various embodiments, the list of target languages may be displayed as a drop down list on the GUI. For example, the list may include English, French, Spanish, German, and Italian.

The target language module 600 then stores the user's selected particular target language as shown in Step 630. In various embodiments, the module 600 saves the user's selected particular target language in the repository. In other embodiments, the module 600 saves the user's selection locally on the user's computer system. For example, the module 600 may store the user's selection in an XML file or a text file on the user's computer.

In addition, in a further embodiment, the target language module 600 allows the user to establish a hierarchy of two or more languages as the preferred target languages for the user. For example, the user may primarily speak Spanish but may also speak some French. Thus, the user may identify Spanish as the user's first particular target language and French as the user's second particular target language. Therefore, if a translation has not been provided for a particular term or phrase in the user's first particular target language, the translation module 300 retrieves the second particular target language stored by the target language module 600 and identifies a preferred translation for the term or phrase in the user's second particular target language, if one has been provided.

As described below in relation to FIG. 8, the translation module 300 utilizes the preferences stored by the target language module 600 to identify the preferred translation for the one or more terms or phrases.

Exemplary Process for Identifying the Preferred Translation

Figure 7:
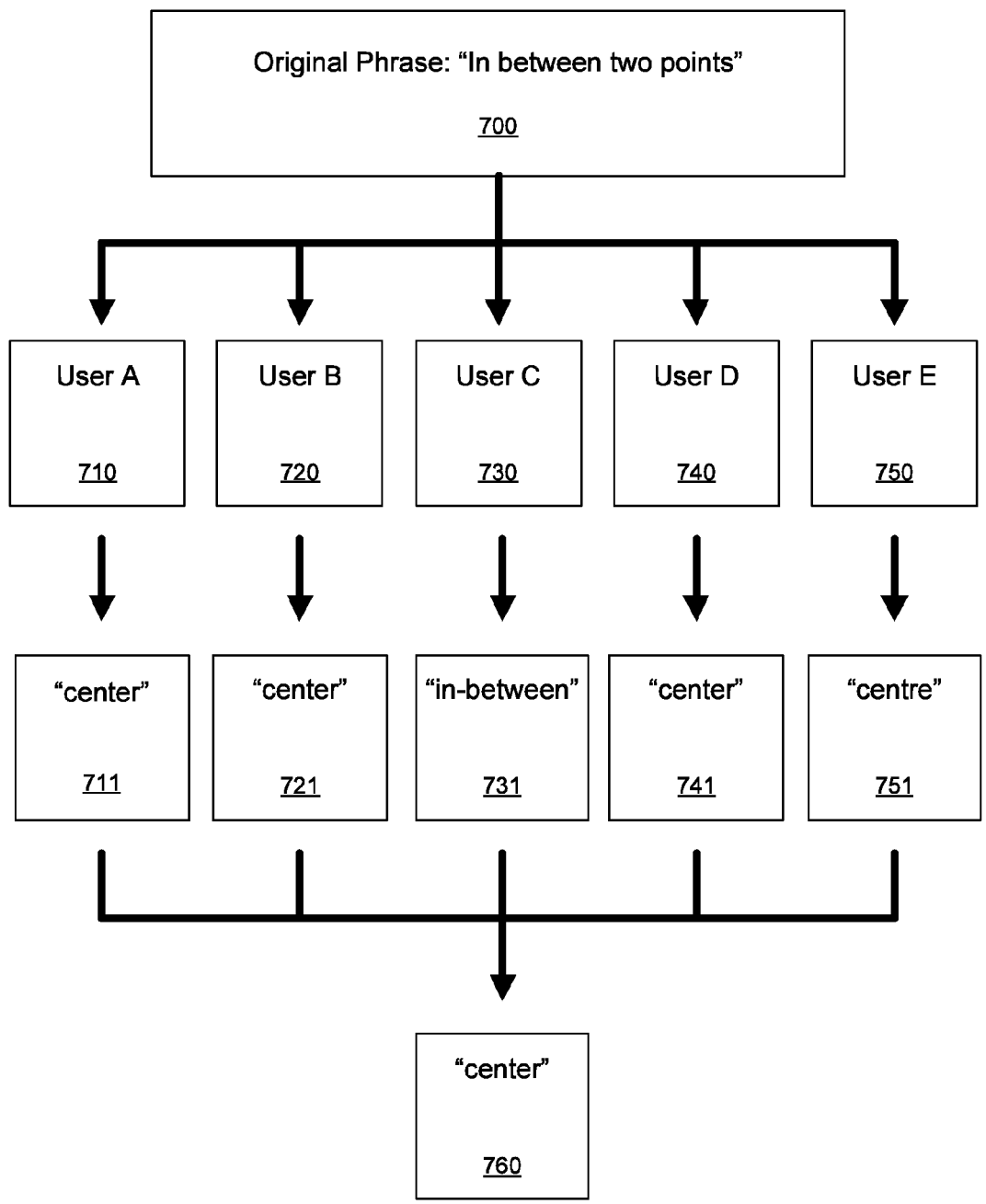
FIG. 7 is a diagram illustrating a process for identifying the preferred translation for a particular term or phrase according to various embodiments of the invention.

As described above in relation to FIG. 3, the translation module 300 identifies a preferred translation for each individual term or phrase for each target language. FIG. 7 provides an exemplary diagram 700 showing how a preferred translation for a particular term or phrase is identified according to various embodiments of the invention. In particular, according to the diagram 700, the most frequently provided translation for a particular term or phrase is identified and marked as the preferred translation. For instance, consider five users, 710, 720, 730, 740, and 750, who provide a translation for the phrase "in between two points" 700, as shown in FIG. 7. These users specify any translation in the target language that they feel most appropriately conveys the meaning of the phrase. (Note that the translation provided in the example is English to English to help readers understand the concept.) User A 710, User B 720, and User D 740 provide the translation "center," shown respectively as 711, 721, and 741, to specify the phrase "in between two points" 700. In addition, User C 730 provides the translation "in-between" 731 and User E 750 provides the translation "centre" 751 to specify the phrase. As contributions stand, the term "center" is the most frequently provided translation. Thus, the preferred translation for the phrase "in between two points" 700 is "center" 760.

A different and more appropriate translation may emerge as more translations are provided, according to various embodiments. As a result, errors in translations, misspelled translations, and even intentional incorrect translations may be naturally handled by this interactive process. In addition, in some embodiments, because most users have a vested interest in contributing the most correction translation and the probability of having multiple misspelled translations, errors, or otherwise incorrect translations that are the same as other contributed translations is lower than having the correct translation, it is more likely that the most often provided translation is the appropriate translation Thus, such a process provides the advantage of self correcting, in addition to evolution of a translation, according to various embodiments.

The preferred translation may be identified in other ways according to various other embodiments. For example, various embodiments may implement rules to govern which translations are preferred. Other embodiments may utilize an administrator who manages the translations and selects the most appropriate translation.

Under certain circumstances, a user may prefer a particular translation for a term or phrase that is not the most frequently provided translation. For example, User E 750 in FIG. 7 may wish to use his translation "centre" 751 over the preferred translation "center" 760. Therefore, according to various embodiments, an individual's provided translations are stored locally on his computer system. The next time User E 730 returns to use the application in which he provided the translation "centre" and requests a translation, the translation module 300 checks the local storage of the user's computer to identify any previously contributed translations and uses the locally stored translations as the preferred translations for the particular terms and phrases. Thus, User E's translation "centre" 751 is used for the original phrase "in between two points" 700.

The translation module 300 according to various embodiments may also receive from the user an indication as to whether the user would like to save the contributed translation locally and/or set the translation provided by the user as the preferred translation for the term or phrase. In addition, according to other various embodiments, the translation module 300 may save the translations in a repository located remotely from the user and identify the translations as the preferred translation for particular users, for example, by utilizing user identifiers.

Thus, various embodiments provide several advantages over traditional processes for providing translations of software applications. First, the most often used terms and phrases of the application are typically translated and readily available upon selection of a target language. The users of the application have a vested interest to have the application in their own language, and therefore the terms and phrases most critical to the use of the application are typically translated first. As a result, by users helping themselves by translating, various embodiments force altruism by providing the translations to the collective pool of translations. As a result, any contributed translations are made available to other users in real-time, or substantially in real-time. Accordingly, a user using the application may experience an immediate benefit after a translation is added to the collective pool of translations.

In addition, according to various embodiments, the translation of the software application for a particular language is often completed much faster than via a translation service. For example, as users continue to benefit from other translations and contribute their own translations, the translation effort is made into a joint effort. Thus, when a user applies a benefit, e.g., provides a translation, other users of the application enjoy the benefit.

Finally, according to various embodiments, a software application does not need to be re-built, re-compiled, or re-distributed to make a new translation available. Because a translation is available in real-time or substantially in real-time after being added, the application does not require any intervention by a development team.

Exemplary Processes for Providing a Preferred Translation

As described above in relation to FIG. 3, the translation module 300, according to various embodiments, uses the translations provided by the user during the current session of the application or the target language selection stored by the target language module 600 to identify a preferred target language for the user. This preferred target language is then used to identify the language in which to display the one or more terms or phrases for the application to the user.

Figure 8:
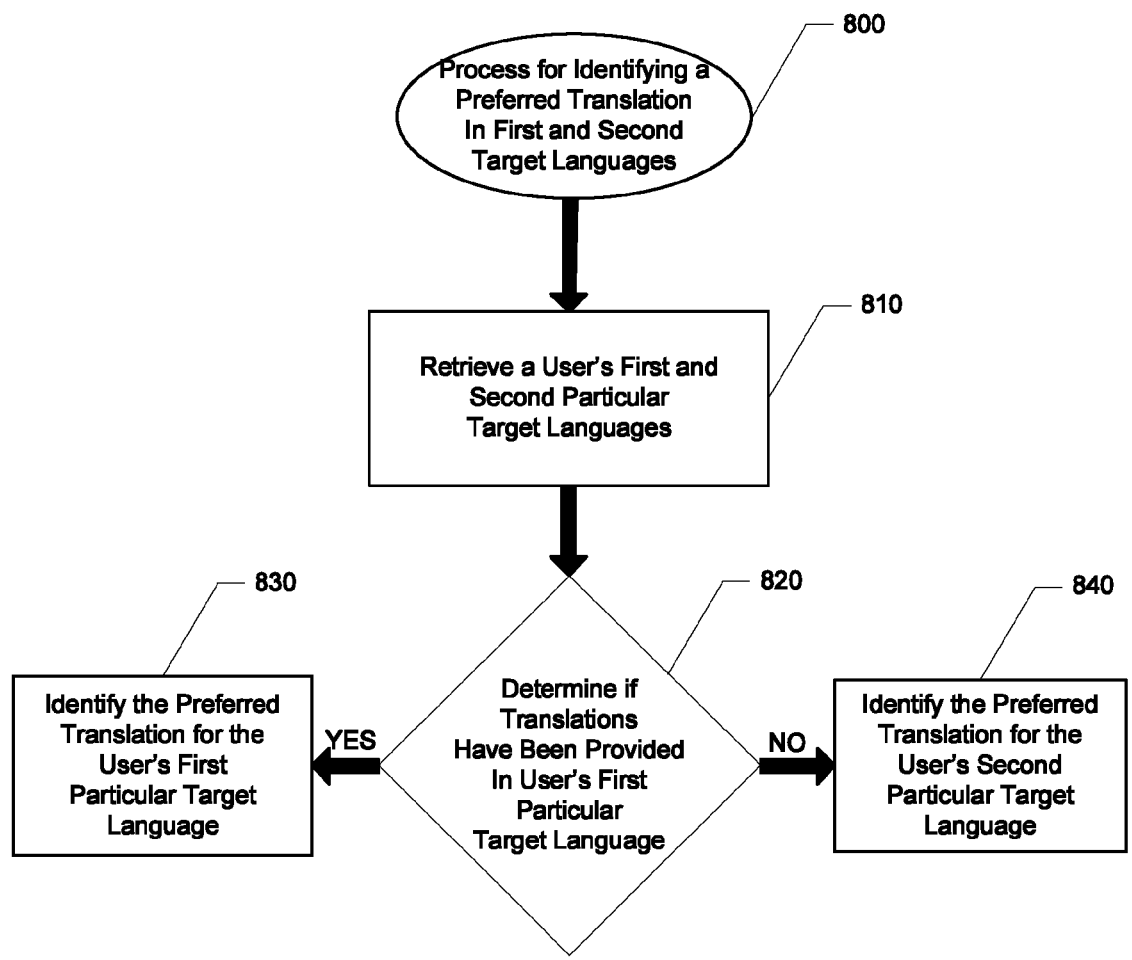
FIG. 8 is a flow chart illustrating a process for providing a translation of one or more terms in first and second target languages according to various embodiments of the invention.

If the user has established a hierarchy or two or more languages that are preferred by the user, the translation module 300, according to a particular embodiment, executes the exemplary process 800 described in relation to FIG. 8 of providing a preferred translation in a first and a second target language Beginning at Step 810, the translation module 300 retrieves the user's first and second particular target languages In various embodiments, the translation module 300 retrieves the user's first and second particular target languages from the repository or from a file that is stored locally on the user's desktop computer.

Next, in Step 820, the translation module 300 determines if one or more translations have been provided for a particular term or phrase of the set of one more terms or phrases in the user's first particular target language. In various embodiments this step includes querying the repository. If the translation module 300 determines that one or more translations have been provided for the particular term or phrase (e.g., the query returns one or more records), the translation module 300 identifies the preferred translation for the term or phrase for the user's first particular target language, shown as Step 830. However, if the translation module 300 determines that no translations have been provided for the particular term or phrase (e.g., the query fails to return any records), the translation module 300 identifies the preferred translation for the term or phrase in the user's second particular target language, shown as Step 840. If no translation has been provided in the user's second particular target language, the translation module 300 does not change the term or phrase from the native language.

Thus, for example, if the user has identified Spanish as his first particular target language and French as his second particular target language, the translation module 300 selects the most frequently provided Spanish translation for each term or phrase as the preferred translation in response having one or more Spanish translations provided for each term or phrase. However, if a translation for a particular term or phrase is not provided in Spanish, the translation module 300 identifies the preferred translation for the particular term or phrase in French. Accordingly, the translation module 300 identifies the preferred French translation by selecting the most frequently provided French translation for the particular term or phrase.

The translation module 300 then displays the preferred translations in the selected target languages to the user according to the hierarchy established by the user. Returning to the above example, the translation module 300 displays the terms and phrases in the GUI for which translations are available in Spanish. However because the Spanish translation for the particular term or phrase has not been provided, the translation module 300 displays the particular term or phrase in French. If a Spanish translation for the particular term or phrase is provided during the time period from the current session of the application to a subsequent session of the application, the Spanish translation of the particular term or phrase is displayed in the subsequent session of the application.

Figure 9:
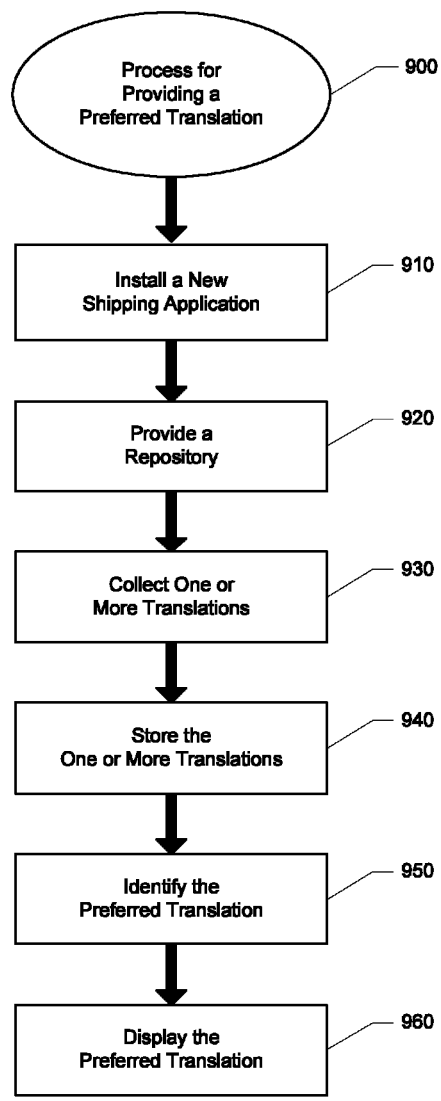
FIG. 9 is a flow chart illustrating a process for providing a preferred translation according to various embodiments of the invention.

FIG. 9 illustrates an exemplary process 900 for providing a preferred translation according to a particular embodiment of the invention. This example is given for illustration purposes only and in no way should be construed to limit the scope of the invention.

In Step 901, the process 900 begins with an organization installing a new shipping application at its distribution center located in Guadalajara, Mexico. The shipping application was initially developed in the United States, and the primary language of the application is English. No other versions of the application exist in other languages. Therefore, the developers provide the English version of the shipping application to install at the distribution center to receive translations, such as Spanish translations, because there are at least a few people who work at the distribution center who speak multiple languages such as Spanish and English.

The process 900 continues with providing a repository to store translations, shown as Step 920. For example, the developers also install a database on a centrally located server that is accessible to a group of users of the shipping application in conjunction with the installation of the shipping application. The group of users use the shipping application on computer systems remotely located from the repository and the computer systems are in communication with the repository via a network, such as a LAN, the Internet, or a wireless network. Furthermore, the users' computer systems are located remotely from each other.

The process 900 further continues with collecting one or more translations for individual terms or phrases of a set of terms or phrases provided by one or more users in a target language, shown as Step 930. Once the English version has been installed, those who speak both Spanish and English begin to use the new shipping application and contribute translations for terms and phrases encountered while using the application. For instance, these individuals provide translations in Spanish of visible labels, error text, and other user-readable text found on GUIs of the application. For example, a user right clicks on a phrase, such as "click button to continue," that appears in a dialog box on an application screen and types in the appropriate translation in Spanish for the phrase (e.g., "oprimar el boton para continuar"). The phrase changes on the screen to the provided translation and the translation is sent to the repository over the network where it is stored, shown as Step 940.

There may also be individuals who speak German in addition to English and Spanish. Therefore, another user may contribute the German translation "weiter" for the phrase "click button to continue," that appears in the dialog box on the application screen. Again, the phrase changes on the screen to the provided translation and the translation is sent to the repository over the network where it is stored.

A unique identifier is also stored along with the translation to identify the particular translation. Thus, the Spanish translation "oprimar el boton para continuar" and the German translation "weiter" are stored in the repository along with a unique identifier for each translation. A global unique identifier is also stored along with each translation that identifies the specific term or phrase that is translated and a language identifier is also stored along with each translation to identify the particular language the translation was provided for.

Furthermore, translations for a particular language may be stored separately in the repository from translations for a different particular language. For example, the German translation "weiter" may be stored in one or more particular tables and the Spanish translation "oprimar el boton para continuar" may be stored in one or more different particular tables. This may allow a translation for a particular language to be more easily identified in the repository.

Once the translations have been stored in the repository, they are now available for other users of the shipping application. As a result, a subsequent user of the application can either: (1) contribute new translations for individual terms and phrases of the set of one or more terms or phrases; (2) request an existing translation of the set of one or more terms or phrases; or (3) both contribute translations and request an existing translation.

Thus, a subsequent user of the shipping application can request a translation be provided in Spanish or German. In response, the process 900 identifies the preferred translation for each individual term or phrase of the set of one more terms or phrases for the particular target language, shown as Step 950. For example, the process 900 identifies the preferred translation for each individual term or phrase as the translation most frequently provided by the users for the individual term or phrase.

The process 900 continues by displaying the identified preferred translation to the user, shown as Step 960. For example, the process 900 provides the translation "welter" for the phrase "click button to continue" that appears in the dialog box on the application screen when a user begins to use the shipping application and requests a translation of the set of one or more terms or phrases in German. In addition, the process 900 provides the translation "oprimar el boton para continuar" for the phrase "click button to continue," for the same dialog box of the application when a user begins to use the shipping application and requests a translation of the set of one or more terms or phrases in Spanish. As a result, users who speak different languages may use the shipping application and view the GUIs in their preferred target language.

This process 900 affords a considerable advantage over typical processes used to provide translations for software applications. For instance, the process 900 can provide translations for an unlimited number of target languages with minimal efforts by the developers. Thus, for example, the process 900 can provide a translation in English, French, Spanish, German, and Russian for the shipping application installed in the distribution center in Guadalajara, Mexico without the time and expense necessary to have a translation service supply a translation for each of these languages.

In addition, the process 900 according to various embodiments allows the users to define the available translations on any level of granularity. As discussed above, the process 900 can provide translations in multiple languages such as English, French, and German. However, the process 900 can also provide alternative terms or phrases in the same (or native) language.

For instance, a language may have distinct regional dialects. For example, French spoken is France has different words and grammatical rules than French spoken in Canada. The process 900 allows for a French-France translation to be provided along with a French-Canada translation by collecting translations provided by users for the set of one or more terms or phrases for the two distinct dialects of French that are spoken. Therefore, a French-Canadian user can request a translation in the dialect he or she prefers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A system for providing a translation of a set of one or more terms or phrases, the system comprising:
   (a) a memory adapted to store one or more translations of said set of one or more terms or phrases in said more than one target language; and
   (b) a processor in communication with said memory and adapted to execute a translation module, wherein said translation module is adapted for execution by said processor to:
      (1) obtain said one or more translations in said more than one target language for individual terms or phrases of said set of one or more terms or phrases provided by one or more users, wherein said one or more users enter said one or more translations into one or more computer systems, that are in communication with said processor;
      (2) store said one or more translations for said individual terms or phrases in said memory;
      (3) in response to receiving a user's request for a preferred translation of each term or phrase in said set of one or more terms or phrases:
         (i) identify said preferred translation for each individual term or phrase of said set of one or more terms or phrases in a first particular target language;
         (ii) in response to a translation not being provided for an individual term or phrase of said set of one or more terms or phrases for said first target language, identify said preferred translation for said individual term or phrase in a second target language; and
         (iii) cause display of said identified preferred translation to said user.

2. The system of claim 1, wherein said user identifies at least one of said first particular target language and said second particular target language associated with said user.

3. The system of claim 2, wherein said translation module is adapted for execution by said processor to:
   (1) display a list of target languages to said user; and
   (2) associate at least one of said user's selected first and second particular target languages selected by said user from said list of target languages with said user.

4. The system of claim 1, wherein at least one of said first particular target language and said second particular target language are automatically identified based at least in part on the IP address associated with a user's computing device.

5. The system of claim 1, wherein said translation module is adapted for execution by said processor to store at least one of said first particular target language and said second particular target language associated with said user.

6. The system of claim 5, wherein, in response to receiving a user's request for a preferred translation of each term or phrase in said set of one or more terms or phrases, said translation module is further adapted for execution by said processor to retrieve at least one of said first particular target language and said second particular target language.

7. The system of claim 5, wherein at least one of said first and second particular target languages are stored in said memory.

8. The system of claim 5, wherein at least one of said first and second particular target languages are stored on said user's system.

9. The system of claim 1, wherein said preferred translation for each said individual term or phrase in said first or second target language is a translation of said one or more translations most frequently obtained from said one or more users for each said individual term or phrase in said first or second target language respectively.

10. The system of claim 1, wherein said memory comprises a database.

11. The system of claim 1, wherein said translation module is further adapted for execution by said processor to associate each translation of said one or more translations for said individual terms of phrase with an identifier associated with a particular target language.

12. The system of claim 1, wherein said one or more computer systems are remotely located from each other.

13. The system of claim 1, wherein said one or more translations for said individual terms or phrases provided by said user are stored locally on said user's system to be used by said user as said preferred translation for said particular individual terms or phrases.

14. The system of claim 13, wherein said one or more translations stored locally on said user's system are stored in an XML file.

15. The system of claim 1, wherein said set of one or more terms or phrases comprises visible labels, error text, and other user-readable text associated with one or more graphical user interfaces (GUI) used by said one or more users.

16. The system of claim 1, wherein said translation module is further adapted to store each translation of said one or more translations along with an identifier that identifies a particular user of said one or more users that provided said particular translation.

17. A computer-implemented method for providing a translation of a set of one or more terms or phrases, the method comprising the steps of:
   (a) providing a repository in a memory for storing one or more translations of said set of one or more terms or phrases in said more than one target language;
   (b) collecting said one or more translations for said set of one or more terms or phrases in said more than one target language provided by one or more users wherein collecting said one or more translations comprises the steps of:
      (1) obtaining one or more translations in said more than one target language for individual terms or phrases of said set of one or more terms or phrases provided by said one or more users; and
      (2) storing said one or more translations for said individual terms or phrases in said repository,
   wherein the method further comprises the steps of:
   (c) in response to receiving a user's request for a preferred translation of said set of one or more terms or phrases:
      (1) identifying said preferred translation for each individual term or phrase of said set of one or more terms or phrases in a first particular target language;
      (2) in response to a translation not being provided for an individual term or phrase of said set of one or more terms or phrases for said first target language, identifying said preferred translation for said individual term or phrase in a second target language; and (3) causing display of said identified preferred translation to said user.

18. The method of claim 17, wherein in response to receiving said user's request for a preferred translation of said set of one or more phrases:

identifying at least one of said first particular target language and said second particular target language.

19. The method of claim 17, further comprising the step of:

receiving user input identifying at least one of said first particular target language and said second particular target language.

20. The method of claim 19, wherein storing at least one of said first particular target language and said second particular target language comprises the steps of:

(1) displaying a list of target languages to said user; and (2) associating at least one of said user's selected first and second particular target languages in response to obtaining at least one of said first and second particular target languages selected by said user from said list of target languages.

21. The method of claim 18, further comprising the step of:

automatically identifying at least one of said first particular target language and said second particular target language at least in part on the IP address associated with a user's computing device.

22. The method of claim 17, further comprising the step of storing at least one of said first particular target language and said second particular target language.

23. The system of claim 22, wherein at least one of said first and second particular target languages are stored in said repository.

24. The method of claim 23, wherein, in response to receiving a user's request for a preferred translation of each term or phrase in said set of one or more terms or phrases:

retrieving at least one of said first particular target language and said second particular target language.

25. The method of claim 17, wherein said user is using a computer system remotely located from said repository and at least one of said first and second particular target languages are stored on said user's system.

26. The method of claim 17, wherein said one or more translations for each individual term or phrase are stored in said memory along with a global unique identifier that identifies each particular term or phrase.

27. The method of claim 17, wherein said repository comprises a database.

28. The method of claim 17, further comprising the step of associating each translation of said one or more translations with an identifier associated with a particular target language.

29. The method of claim 17, wherein said one or more users are using computer systems remotely located from said repository and said systems are in communication with said repository via a network.

30. The method of claim 29, wherein said one or more users are using systems remotely located from each other.

31. The method of claim 30, wherein said one or more translations for said individual terms or phrases provided by a user of said one or more users are stored locally on said user's system to be used by said user as said preferred translation for said particular individual terms or phrases.

32. The method of claim 17, wherein said set of one or more terms or phrases comprises visible labels, error text, and other user-readable text associated with one or more graphical user interfaces (GUI).

33. The method of claim 17, wherein said step of storing said one or more translations for said individual terms or phrases in said repository comprises storing each translation of said one or more translations along with an identifier that identifies a particular user of said one or more users that provided said particular translation.

* * * * *